United States Patent [19]

Hefner

[11] Patent Number: 4,566,102

[45] Date of Patent: Jan. 21, 1986

[54] PARALLEL-SHIFT ERROR RECONFIGURATION

[75] Inventor: James L. Hefner, Endicott, N.Y.

[73] Assignee: International Business Machines Corporation, Armonk, N.Y.

[21] Appl. No.: 485,816

[22] Filed: Apr. 18, 1983

[51] Int. Cl.[4] .............................................. G11C 29/00
[52] U.S. Cl. ..................................... 371/11; 365/200; 371/10
[58] Field of Search ............................ 371/10, 11, 21; 365/200, 210; 364/200, 900

[56] References Cited

U.S. PATENT DOCUMENTS

| 3,995,261 | 11/1976 | Goldberg | 365/200 |
| 4,038,648 | 7/1977 | Chesley | 371/11 |
| 4,087,811 | 5/1978 | Weinberger | 340/347 DD |
| 4,089,063 | 5/1978 | Takezono et al. | 365/200 |
| 4,155,121 | 5/1979 | Jambotkar | 371/10 |
| 4,188,670 | 2/1980 | Hsia | 371/10 |
| 4,191,996 | 3/1980 | Chesley | 371/10 |
| 4,345,319 | 8/1982 | Bernardini et al. | 365/200 |
| 4,389,715 | 7/1983 | Eaton | 371/10 |
| 4,459,685 | 7/1984 | Sud et al. | 371/10 |
| 4,463,450 | 7/1984 | Haeuscele | 365/200 |
| 4,471,472 | 9/1984 | Young | 371/10 |

Primary Examiner—Michael R. Fleming
Attorney, Agent, or Firm—M. W. Schecter; J. Jancin, Jr.; J. Bouchard

[57] ABSTRACT

A reconfigurable parallel group of identical functional units and a method for reconfiguring this parallel grouping of identical functional units upon the occurrence of a failure by shifting the contents of the failed unit and the contents of all units between the failed unit and a spare unit one unit toward the spare unit is disclosed. A paired system of input and output busses allows control lines to activate and deactivate the appropriate busses so that a constant input output interface is maintained despite the failure provoked shift. This reconfigurable parallel group can also be stacked together to form larger configurations.

11 Claims, 5 Drawing Figures

FIG. 4

CONFIG. CTL. REG.

| C0 | C1 | C2 | SP |
|----|----|----|----|
| 0  | 0  | 0  | 0  |
| 0  | 0  | 1  | 0  |
| 0  | 1  | 0  | 0  |
| 0  | 1  | 1  | 0  |
| 1  | 0  | 0  | 0  |
| 1  | 0  | 1  | 0  |
| 1  | 1  | 0  | 0  |
| 1  | 1  | 1  | 0  |
| 0  | 0  | 0  | 1  |

ALL OTHER COMBINATIONS ARE INVALID

CIPT. CTL. OUTPUTS

| I0 | I1 | I2 | I3 | I4 | I5 | I6 | I7 | IS |
|----|----|----|----|----|----|----|----|----|
| N  | 0  | 0  | 0  | 0  | 0  | 0  | 0  | N  |
| O  | 1  | 0  | 0  | 0  | 0  | 0  | 0  | O  |
| T  | 0  | 1  | 0  | 0  | 0  | 0  | 0  | T  |
| 0  | 0  | 0  | 1  | 0  | 0  | 0  | 0  | U  |
| U  | 0  | 0  | 0  | 1  | 0  | 0  | 0  | U  |
| S  | 0  | 0  | 0  | 0  | 1  | 0  | 0  | S  |
| E  | 0  | 0  | 0  | 0  | 0  | 1  | 0  | E  |
| D  | 0  | 0  | 0  | 0  | 0  | 0  | 1  | D  |
| 0  | 0  | 0  | 0  | 0  | 0  | 0  | 0  | 0  |

A/B CTL. OUTPUTS (0=A;1=B)

| B0 | B1 | B2 | B3 | B4 | B5 | B6 | B7 | BS |
|----|----|----|----|----|----|----|----|----|
| 0  | 0  | 0  | 0  | 0  | 0  | 0  | 0  | 0  |
| 1  | 0  | 0  | 0  | 0  | 0  | 0  | 0  | 0  |
| 1  | 1  | 0  | 0  | 0  | 0  | 0  | 0  | 0  |
| 1  | 1  | 1  | 0  | 0  | 0  | 0  | 0  | 0  |
| 1  | 1  | 1  | 1  | 0  | 0  | 0  | 0  | 0  |
| 1  | 1  | 1  | 1  | 1  | 0  | 0  | 0  | 0  |
| 1  | 1  | 1  | 1  | 1  | 1  | 0  | 0  | 0  |
| 1  | 1  | 1  | 1  | 1  | 1  | 1  | 0  | 0  |
| 1  | 1  | 1  | 1  | 1  | 1  | 1  | 1  | 1  |

PARALLEL-SHIFT ERROR RECONFIGURATION

TECHNICAL FIELD

The invention relates to a reconfigurable parallel group of identical functional units as well as the method for performing the reconfiguration.

BACKGROUND OF THE INVENTION

Reliability and availability have become a major concern to businesses and individuals who are becoming more and more dependent upon the computer for sustaining production or development productivity in various environments. Extended outages cannot be tolerated and therefore, these businesses and individuals are placing heavy weight on RAS (relability, availability and serviceability) performance statistics in their purchase considerations.

Future system designs must incorporate techniques to increase RAS performance to satisfy customer demands, but also to decrease the field repair actions and scrap and rework costs.

Previous systems having no reconfiguration capability, require FRU (Field Replaceable Unit) replacement at a failure occurrence. This may cause extensive system outages due to customer engineer arrival delays, trouble-shooting time and procurement and installation of parts. Reconfiguration of the hardware to utilize spare components in place of failing components prevents extensive outages and permits continued operation in the best case or requires a program RESTART or RE-IPL (initial program load) for catastrophic failures.

Several techniques have been applied to increase system reliability and availability by reconfiguration of hardware after a component or unit failure. Specifically, since failure rates have been significantly higher for bipolar arrays than for logic chips in a processor, system design techniques such as reconfiguration have been used to improve the reliability and availability of these bipolar arrays. Such an improvement would make the most significant contribution toward increasing the overall reliability and availability of the processor. These bipolar arrays are generally used in local storage (i.e., register files), cache, control storage RAMs, and channel buffers.

A first type of reconfiguration which has been employed with bipolar arrays is to utilize half of the array depth for functional purposes and to reconfigure portions of the arrays to the unused half of the array as hard errors are enountered. This method is effective for single-cell or multi-cell failures in half of the chip only, but is ineffective for catastrophic chip failures or address related failures affecting both halves, for example.

A second type of reconfiguration which has been used involves the translation of addressing of spare arrays to map failing chip addresses to spare chip addresses. This method is successful for all chip failure modes, but adds significant additional delay (several nanoseconds) to the critical addressing nets, which generally cannot be tolerated in most high performance processor applications, since the cycle time is largely based upon array access times.

SUMMARY OF THE INVENTION

The reconfiguration technique of the present invention can be applied at any package level (e.g., rows of bits, chips, modules, cards) on a parallel configuration of identical functional units (e.g., arrays, bit-slice elements, vector element processors). This technique involves shifting over one unit in the direction of the spare unit the contents of the failed unit and the contents of all of the units between the failed unit and the spare unit. The outputs of the failed unit are then degated and the rightmost one of the two input busses and the rightmost one of the two output busses associated with each unit are gated to each unit to the left of the failed unit. Similarly, the leftmost one of the two input busses and the leftmost one of the two output busses associated with each unit are gated to each unit to the right of the failed unit.

The present invention has several advantages over other reconfiguration techniques:

(1) Only one unit of redundancy is required for any number of parallel units,
(2) A constant input and output interface is maintained,
(3) Constant fan-in and fan-out parameters for any width configuration,
(4) Minimal delay penalty to data paths,
(5) No delay penalty in control paths to units, and
(6) All failure modes are covered, including chip-kills.

BRIEF DESCRIPTION OF THE DRAWING

FIG. 4 is an illustration of a method of controlling the reconfiguration technique of the present invention.

BEST MODE FOR CARRYING OUT THE INVENTION

The reconfiguration technique of the present invention is described below in the context of a memory array configuration. It should be clearly understood that the present invention can be applied to any parallel configuration of identical functional units.

Figure 1:
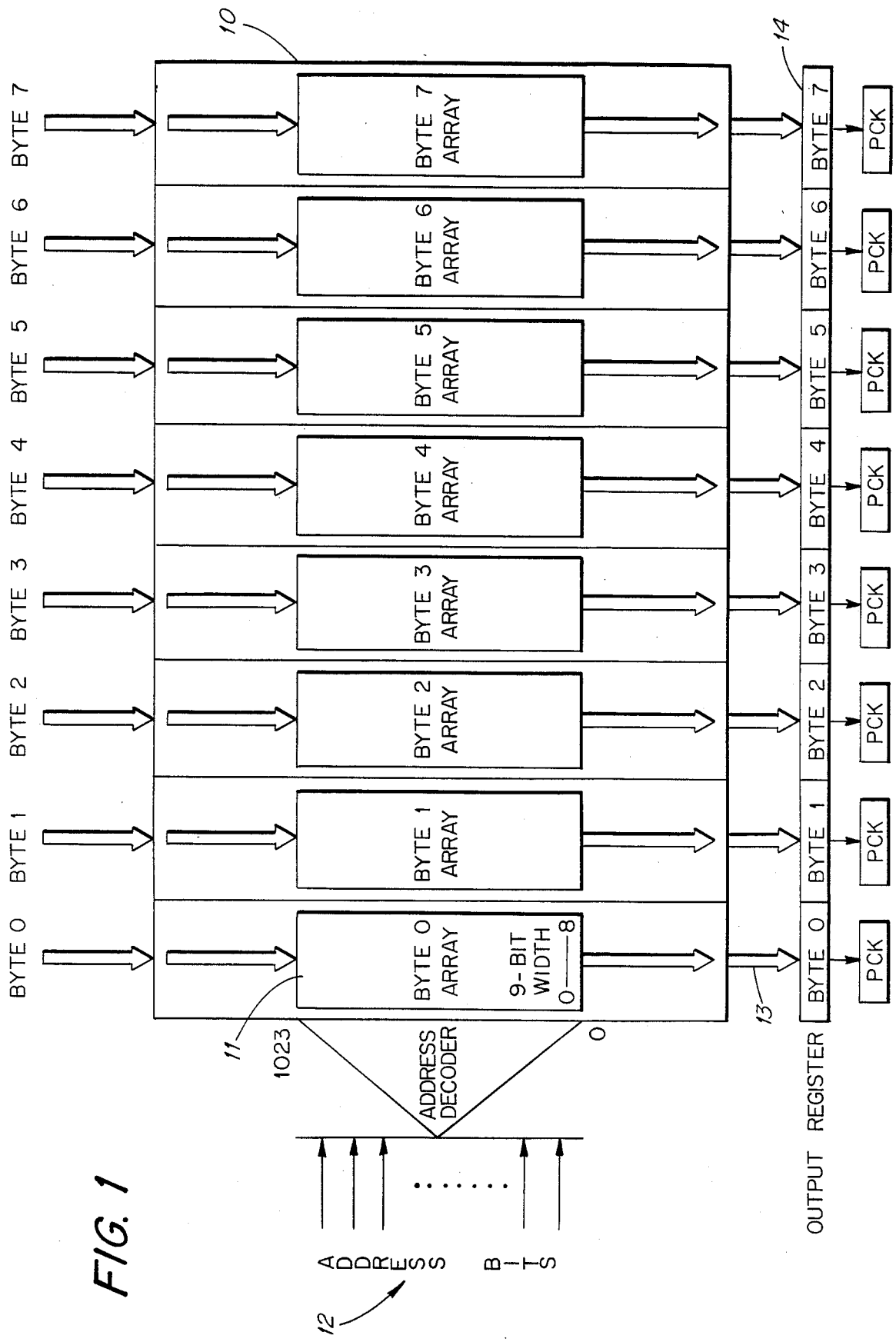
FIG. 1 is an illustration of a conventional array configuration.

Referring to FIG. 1, a conventional array configuration is shown which comprises eight 1024×9 bit array chips 11 configured to provide 1024×72 bits of RAM 10. Each RAM 10 is addressed with the same address bits 12 in parallel. Each chip 11 contains 1024 one byte (8-bits) entries plus an associated parity bit for each byte entry.

The array outputs 13 are latched into an output register 14, where parity checking is done to detect array failures. Individual byte parity checking is also used to provide array chip failure diagnostic isolation capability to a maintenance processor (not shown).

Some failure mode determination can also be done once the failure has been isolated, through single-bit correction methods, if desired. For single-bit failures, the contents of the failing array, with the corrected failing address, can be moved to a spare array and the failing array can be reconfigured to a spare status. Data cannot be recovered for cases of multiple bit errors or other more serious failures, but reconfiguration can take place, requiring system RESTART or RE-IPL, thus providing a minimum system outage.

ECC (error correction coding) techniques, however, are generally not used around internal processor arrays due to the cost and excessive delay introduced into critical paths. Moreover, ECC generally provides only single-bit correction and does not correct the more serious failure modes.

Figure 2:
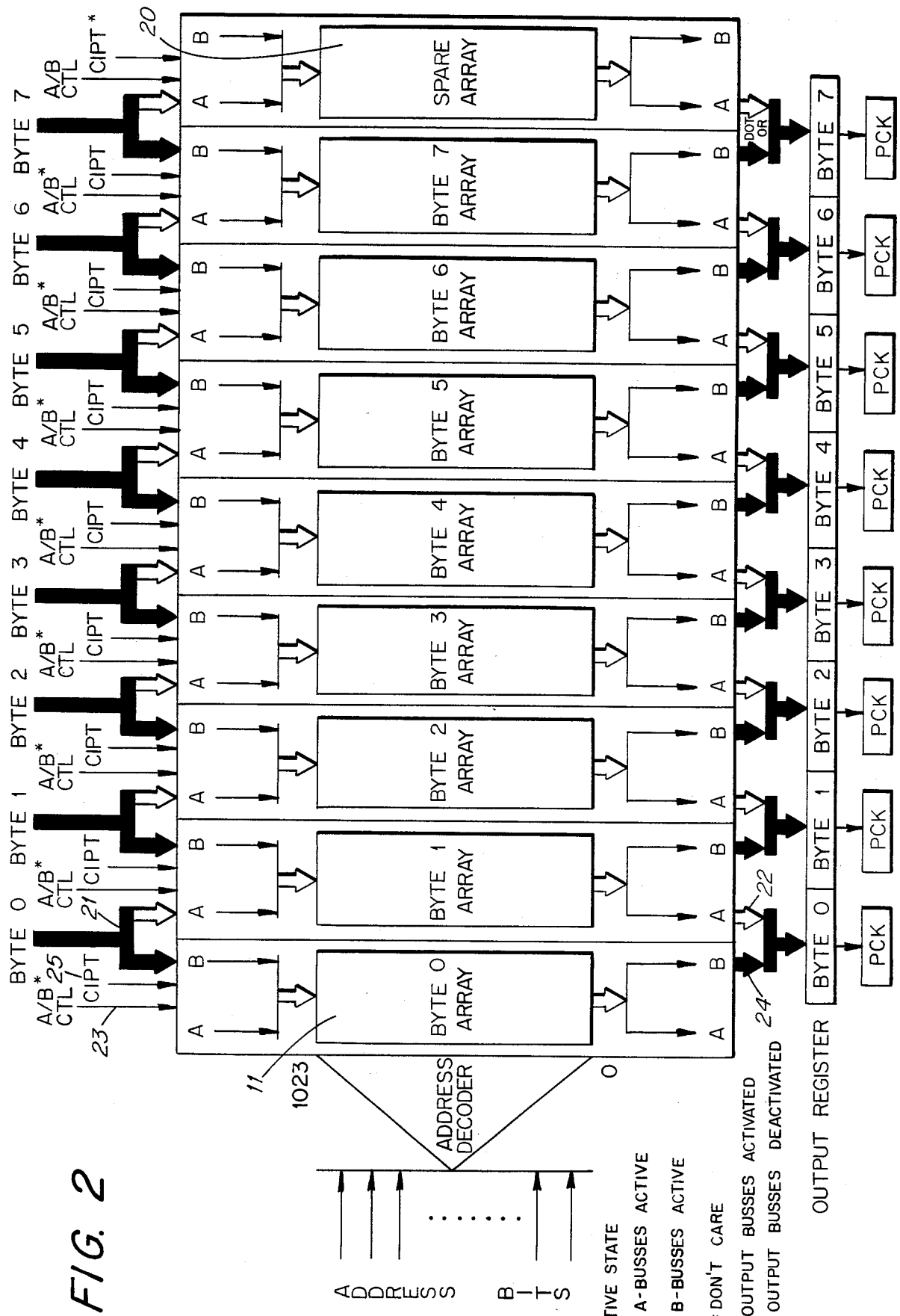
FIG. 2 is an illustration of an array configured for use with the reconfiguration technique of the present invention.

Referring now to FIG. 2, the new array configuration of the present invention includes one spare array 20 in the width of the configuration. This embodiment illustrates an array configuration which is eight plus one spare in width. However, this same approach can be used for any width and still maintain constant fan-in/fan-out parameters (i.e., it is not necessary to add inputs and outputs to the spare to accommodate an increased number of parallel arrays). FIG. 2 shows an additional set of input data busses 21 and output data busses 22 required from array chips 11. Each byte of input bus can drive two adjacent array chip input busses 20 as shown. The A/B Ctl input lines 23 are used to gate either bus A (i.e., the leftmost bus) or bus B (i.e., the rightmost bus) inputs and outputs (i.e., if the A/B Ctl is at a logic one state, the A busses are on; if A/B Ctl is at a logic zero state, the B busses are on). The output busses 22 and 24 are DOT-OR'ed, as shown in FIG. 2, between adjacent chips (B-bus of one array and A-bus of the adjacent array). The output busses 22 and 24 behave such that when a bus is not selected by the A/B Ctl then zeroes appear on the outputs. The CIPT (Chip-In-Place-Test) inputs 25 are used to degate both output buses, when activated, to allow usage of the output interfaces by adjacent chips. For example, referring to FIG. 3, CIPT* signifies an activated input which degates both output busses of related byte 5 array.

Figure 3:
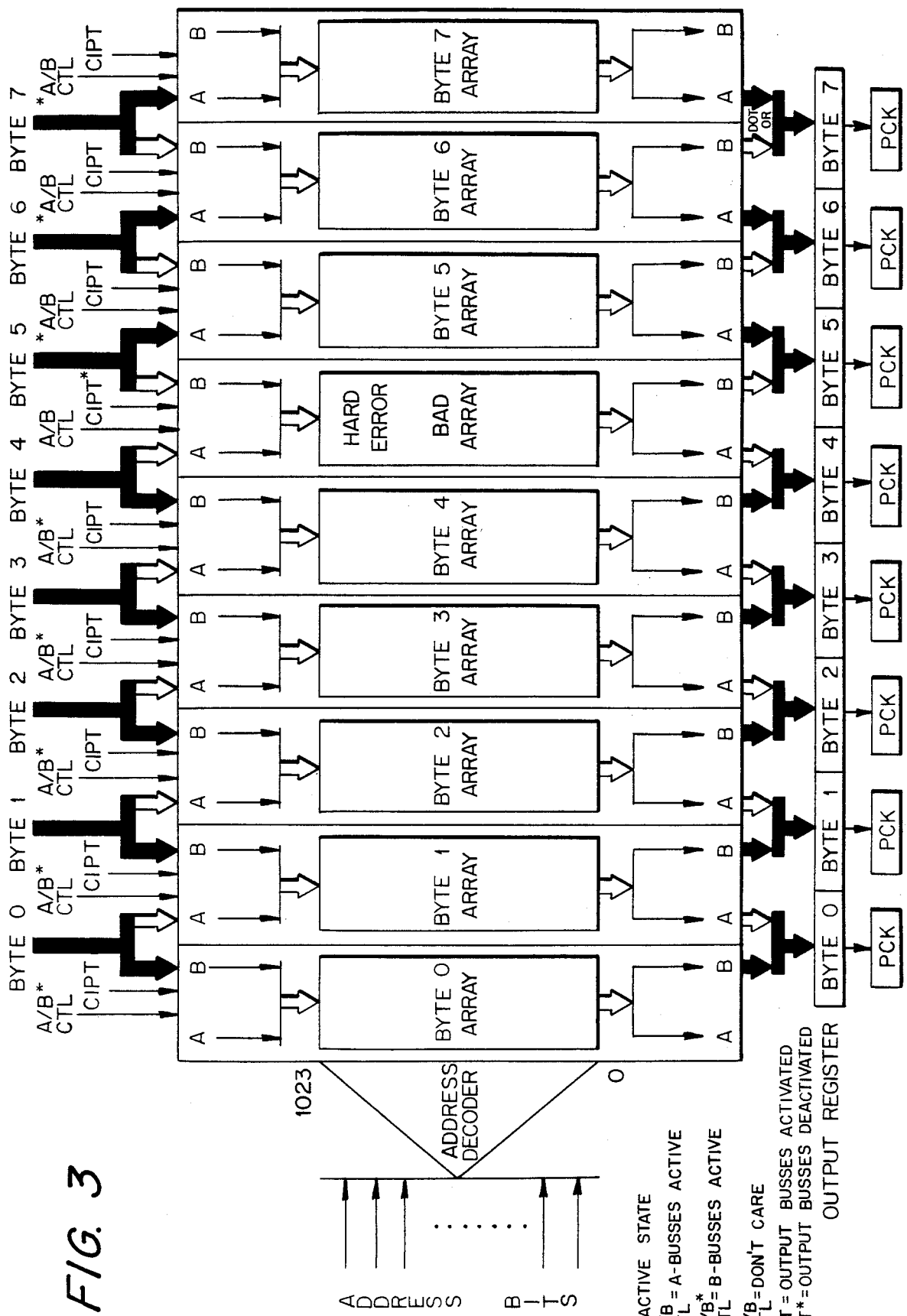
FIG. 3 is an illustration of the reconfiguration technique of the present invention.

FIG. 3 shows the reconfiguration following a hard failure in the byte 5 array. The parallel shift is seen by the fact that the byte 5, 6 and 7 arrays have been logically shifted to the right by one array, now occupying the original byte 6, 7 and spare arrays (see FIGS. 2 and 3), while the vacated chip (originally byte 5) now becomes the new spare array. It should be noted that the same set of input and output busses from the array configuration have been maintained. Also note that the addressing to the arrays has not been affected and that the reconfiguration controls are independent of array addressing. This independence of reconfiguration control and addressing eliminates delay in the control paths to the arrays.

Another advantage of this technique is the fact that the extra set of input and output busses that are required for each array chip and the gating logic to select the proper interface are included in the array chips and not in external logic chips around the arrays. Packaging and wiring problems, as well as much extra delay in the data paths would be introduced by putting this logic external to the array chips.

Referring now to FIG. 4, a 4-bit set of scan-only latches can be used to control the reconfiguration set forth in FIG. 3. This set of latches C0, C1, C2 and SP is controlled through the Maintenance Processor (MP) interface and can be changed accordingly when failure isolation has been completed. For the failed byte 5 example of FIG. 3, the MP would set the 3-bit binary code corresponding to the failing byte into the C0-C2 latches (i.e., '101' for byte 5) and set the SP latch to a zero. This is illustrated by the latch settings shown on line 6 of the Configuration Control Register depicted in FIG. 4. By way of a further example, if the failed array was the byte 3 array, latches C0-C2 would be set as indicated by line 4 of the Configuration Control Register.

C0, C1 and C2 are binary encoded to correspond to the failing byte position. The CIPT line which corresponds to the failing array (see also FIG. 3) noted by C0, C1 and C2 is activated to degate the failing chip outputs. Thus, for example, a failed byte 5 array dictates that the CIPT outputs correspond to those shown on line 6 of the CIPT control outputs depicted in FIG. 4. Accordingly, all chips to the right of the failing chip use the A interface while all chips to the left of the failure use the B interface.

The SP latch is set to a one for the initial system reset configuration. Checking for illegal configurations can be added if desired.

The example in FIG. 3 shows the original byte 5 chip failed. For this example, C0, C1, C2 and SP='1010'.

This will cause the corresponding CIPT (I5) to become active and the A/B Ctls (depicted in FIG. 4 as A/B Control Outputs B0-B7, BS) to '111110000'. The A/B Ctl for the failing chip can be in any state without effect since the CIPT is active for this chip.

The CIPT "not used" wires can be saved for the two end arrays (I0 and IS) by switching the A/B Ctl to the unused interface when configuring as the spare. This causes zeroes to be gated on the used bus, giving the same effect as CIPT. For example, if the leftmost chip were configured as the spare, it's A/B Ctl=0 (A). This gates zeroes on the B bus, allowing the adjacent chip to use the output bus by ORing it's data onto the bus.

Figure 5:
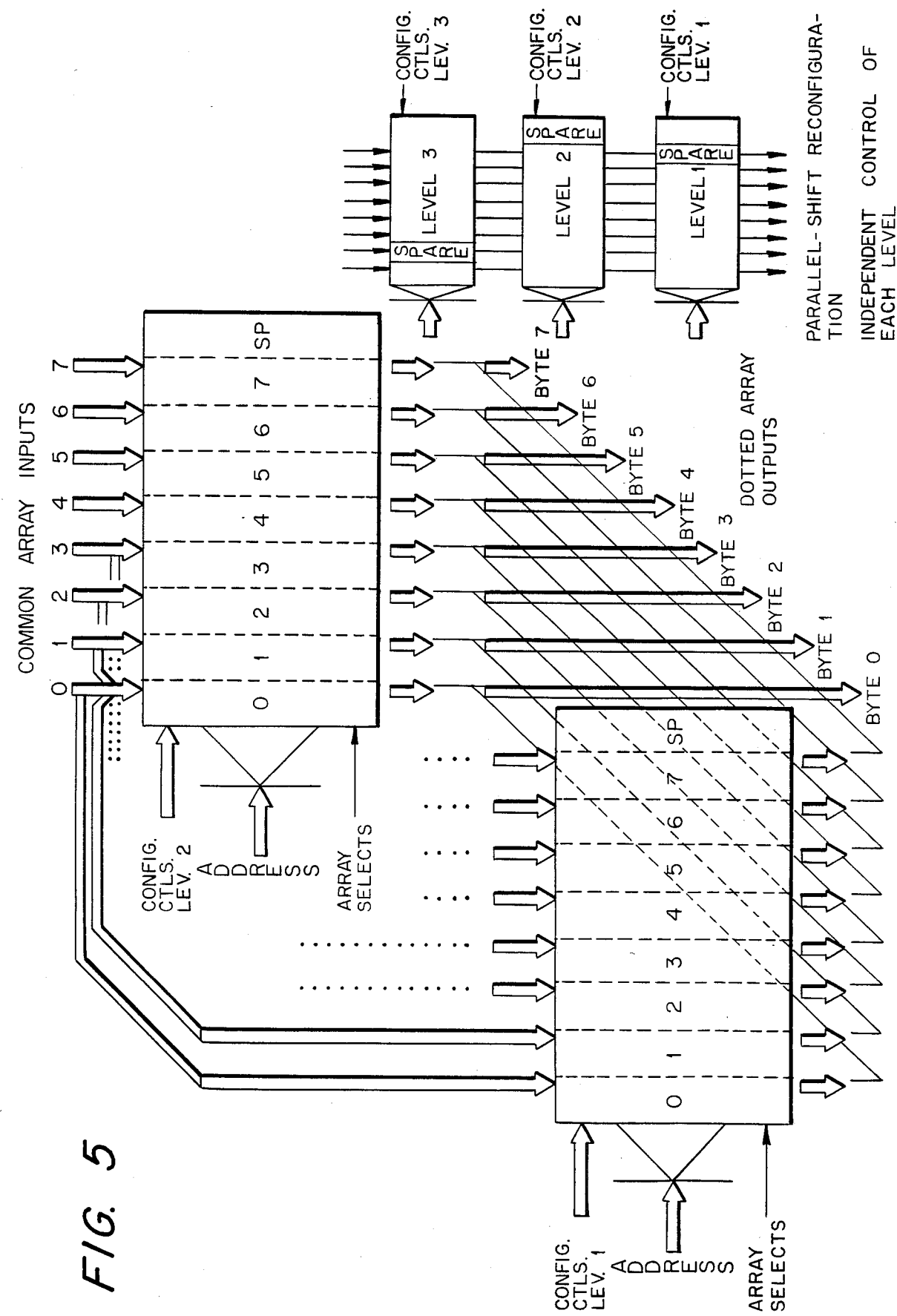
FIG. 5 is an illustration of a stacked array configured for use with the reconfiguration technique of the present invention.

Referring now to FIG. 5, with chip select capabilities that currently exist, arrays can be stacked for depth and maintain independent parallel-shift reconfigurability at each level of the stacked depth. The only penalty is the additional loading and dotting required by the parallel-shift arrangement at each level of the stack of arrays (2 dots on outputs and 2 loads on inputs per level).

Whereas I have illustrated and described the preferred embodiments of my invention, it is understood that I do not limit myself to the precise constructions disclosed herein. I expressly reserve the right to all changes and modifications coming within the scope of the invention as defined in the appended claims.

I claim:

1. A method for reconfiguring a parallel configuration of identical functional units in response to a failure of one of said units, said configuration comprising a rightmost unit serving as a spare, at least two input busses coupled to each of said units except for a leftmost and said rightmost units, and at least two output busses coupled to each of said units except for said leftmost and rightmost units, each of said input and output busses suitably coupled to at least two functional units, the method comprising the steps of:

shifting the contents of the failed unit and the contents of all the units to the right of said failed unit one unit to the right;

deactivating the outputs associated with said failed unit;

activating the rightmost input bus associated with each unit for all of the units to the left of said failed unit;

activating the leftmost input bus associated with each unit for all the units to the right of said failed unit;

activating the rightmost output bus associated with each unit for all of the units to the left of said failed unit and activating the leftmost output bus associated with each unit for all of the units to the right of said failed unit;

whereby said failed unit is operationally eliminated from said parallel configuration of identical functional units.

2. A device having a parallel configuration of units for storing information that can be quickly reconfigured in response to a failure of one of said units comprising:

a plurality of identical functional units, one of said plurality of identical functional units serving as a spare; a common address bus coupled to said plurality of identical functional units for selecting at least one location within said plurality of identical functional units where information is to be written in or read out;

a plurality of input busses coupled to said plurality of identical functional units for routing information to said at least one location, at least two of said input busses each coupled to the same said functional units, each of said input busses switchably coupled to at least two of said functional units;

a plurality of output busses coupled to said plurality of identical functional units for routing information from said at least one location, at least two of said output busses each coupled to the same said functional units, each of said output busses switchably coupled to at least two of said functional units; and a control means coupled to said plurality of identical functional units for operationally eliminating said failed functional unit from said parallel configuration by activating and deactivating certain of said plurality of input busses and certain of said plurality of output busses to shift the contents of said failed unit and the contents of all of said units between said failed unit and said spare unit one unit towards said spare unit in response to a failure of one of said functional units.

3. A method for reconfiguring a parallel configuration of identical functional units in response to a failure of one of said units, said configuration comprising a leftmost unit serving as a spare, at least two input busses coupled to each of said units except for said leftmost and rightmost units, and at least two output busses coupled to each of said units except for said leftmost and rightmost units, each of said input and output busses switchably coupled to at least two functional units, the method comprising the steps of:

shifting the contents of the failed unit and the contents of all the units to the left of said failed unit one unit to the left;

deactivating the outputs associated with said failed unit;

activating the rightmost input bus associated with each unit for all of the units to the left of said failed unit;

activating the leftmost input bus associated with each unit for all of the units to the right of said failed unit;

activating the rightmost output bus associated with each unit for all of the units to the left of said failed unit and activating the leftmost output bus associated with each unit for all of the units to the right of said failed unit whereby said failed unit is operationally eliminated from said parallel configuration of identical functional units.

4. A method for reconfiguring a parallel configuration of identical functional units in response to a failure of one of said units, said configuration comprising a unit serving as a spare, at least two input busses coupled to each of said units except for the leftmost and rightmost units, and at least two output busses coupled to each of said units except for said leftmost and rightmost units, each of said input and output busses switchably coupled to at least two functional units, the method comprising the steps of:

shifting the contents of the failed unit and the contents of all the units between the failed unit and a spare unit one unit towards said spare unit;

deactivating the outputs associated with said failed unit;

activating the rightmost input bus associated with each unit for all of the units to the left of said failed unit;

activating the leftmost input bus associated with each unit for all of the units to the right of said failed unit;

activating the rightmost output bus associated with each unit for all of the units to the left of said failed unit and activating the leftmost output bus associated with each unit for all of the units to the right of said failed unit whereby said failed unit is operationally eliminated from said parallel configuration of identical functional units.

5. A device having a parallel configuration of units for storing information that can be quickly reconfigured in response to a failure of one of said units comprising:

a plurality of identical functional units, one of said plurality of identical functional units serving as a spare;

a common address bus coupled to said plurality of identical functional units for selecting at least one location within said plurality of identical functional units where information is to be written in or read out;

a plurality of input busses coupled to said plurality of identical functional units for routing information to said at least one location, at least two of said input busses each coupled to the same said functional units, each of said input busses switchably coupled to at least two of said functional units;

a plurality of output busses coupled to said plurality of identical functional units for routing information from said at least one location, at least two of said output busses each coupled to the same said functional units, each of said output busses switchably coupled to at least two of said functional units; and a reconfiguration control means independent of said common address bus and coupled to said plurality of identical functional units for operationally eliminating said failed functional unit from said parallel configuration by activating and deactivating at least one of said plurality of input busses and at least one of said plurality of output busses to shift the contents of said failed unit and the contents of all of said units between said failed unit and said spare unit one unit towards said spare unit in response to a failure of one of said functional units.

6. A device having a parallel configuration according to claim 5 wherein the number of inputs and outputs associated with said spare is constant regardless of the number of said plurality of identical functional units.

7. A device including a parallel configuration of units for storing information that can be quickly reconfigured in response to a failure of one of said units comprising:
- a plurality of identical functional units; one of said plurality of identical functional units serving as a spare, each of said plurality of identical functional units further comprising:
  - at least one input bus for routing information to said each of said plurality of functional units,
  - at least one output bus for routing information from said each of said plurality of identical functional units, and
  - gating logic for activating and deactivating said at least one input bus and said at least one output bus;
- a reconfiguration control means coupled to said plurality of identical functional units for operationally eliminating said failed functional unit from said parallel configuration by activating said gating logic to activate said at least one input bus and said at least one output bus of said functional unit serving as a spare and deactivate said at least one input bus and said at least one output bus of said failed functional unit to shift the contents of said failed unit and the contents of all of said units between said failed unit and said spare unit one unit towards said spare unit in response to a failure of one of said functional units; and
- a common address bus independent of said gating logic and said reconfiguration control means and coupled to each of said plurality of identical functional units for selecting at least one location within said plurality of identical functional units for writing information into and reading information out of.

8. A parallel configuration according to claim 2, 5, 6 or 7 wherein said plurality of identical functional units are memory arrays.

9. A device including a stacked configuration of levels of units for storing information that can be reconfigured in response to a failure of one of said units on each level of said stack; each level of said stack comprising:
- a plurality of identical functional units, one of said plurality of identical functional units serving as a spare;
- a plurality of input busses coupled to said plurality of identical functional units for routing information to said plurality of identical functional units, at least two of said input busses each coupled to the same said functional units, each of said input busses switchably coupled to at least two of said functional units;
- a plurality of output busses coupled to said plurality of identical functional units for routing information from said plurality of identical functional units, at least two of said output busses each coupled to the same said functional units, each of said output busses switchably coupled to at least two of said functional units;
- a common address bus coupled to said plurality of identical functional units for selecting at least one location within said plurality of identical functional units for writing information into and reading information out of; and
- a reconfiguration control means independent of said common address bus coupled to said plurality of identical functional units for operationally eliminating said failed functional unit from said stacked configuration by activating and deactivating at least one of said plurality of input busses and at least one said plurality of output busses to shift the contents of said failed unit and the contents of all of said units between said failed unit and said spare unit one unit towards said spare unit in response to a failure of one of said functional units.

10. A device having a stacked configuration of levels of units for storing information that can be quickly reconfigured in response to a failure of one of said units on each level of said stack, each level of said stack comprising:
- a plurality of identical functional units; one of said plurality of identical functional units serving as a spare, each of said plurality of identical functional units further comprising:
  - at least one input bus for routing information to said each of said plurality of identical functional units,
  - at least one output bus for routing information from said each of said plurality of identical functional units, and
  - gating logic for activating and deactivating said at least one input bus and said at least one output bus;
- a reconfiguration control means coupled to said plurality of identical functional units for operationally eliminating said failed functional unit from said parallel configuration by activating said gating logic to activate said at least one input bus and said at least one output bus of said functional unit serving as a spare and deactivate said at least one input bus and said at least one output bus of said failed functional unit to shift the contents of said failed unit and the contents of all of said units between said failed unit and said spare unit one unit towards said spare unit in response to a failure of one of said funetional units; and
- a common address bus independent of said gating logic and said reconfiguration control means and coupled to said plurality of identical functional units for selecting at least one location within said plurality of identical functional units for writing information into and reading information out of.

11. A stacked configuration according to claim 9 or 10 wherein said plurality of identical functional units are memory arrays.

* * * * *